(12) United States Patent
Matthews et al.

(10) Patent No.: US 9,025,452 B2
(45) Date of Patent: May 5, 2015

(54) OVERSUBSCRIPTION MONITOR

(71) Applicant: Broadcom Corporation, Irvine, CA (US)

(72) Inventors: William Brad Matthews, San Jose, CA (US); Puneet Agarwal, Cupertino, CA (US); Bruce Hui Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 240 days.

(21) Appl. No.: 13/827,988

(22) Filed: Mar. 14, 2013

(65) Prior Publication Data

US 2014/0233382 A1 Aug. 21, 2014

Related U.S. Application Data

(60) Provisional application No. 61/765,924, filed on Feb. 18, 2013.

(51) Int. Cl.
*G01R 31/08* (2006.01)
*H04L 12/801* (2013.01)

(52) U.S. Cl.
CPC ..................... *H04L 47/12* (2013.01)

(58) Field of Classification Search
CPC ..... H04L 12/00; H04L 12/2634; H04L 12/54; H04L 47/00; H04L 47/10; H04L 47/11; H04L 47/115; H04L 47/12; H04L 47/122; H04L 47/22; H04L 47/2416; H04L 47/2483
USPC .......... 370/229, 230, 232, 235, 241, 252, 389
See application file for complete search history.

(56) References Cited

U.S. PATENT DOCUMENTS

| | | | | |
|---|---|---|---|---|
| 7,756,025 | B1 * | 7/2010 | Grills | 370/230 |
| 2005/0108444 | A1 * | 5/2005 | Flauaus et al. | 710/15 |
| 2010/0302941 | A1 * | 12/2010 | Prabhakar et al. | 370/230 |
| 2013/0329577 | A1 * | 12/2013 | Suzuki et al. | 370/252 |

* cited by examiner

*Primary Examiner* — Anh Ngoc Nguyen
(74) *Attorney, Agent, or Firm* — Oblon, McClelland, Maier & Neustadt, L.L.P.

(57) ABSTRACT

Aspects of oversubscription monitoring are described. In one embodiment, oversubscription monitoring includes accumulating an amount of data that arrives at a network component over at least one epoch of time. Further, a core processing rate at which data can be processed by the network component is calculated. Based on the amount of data and the core processing rate, it is determined whether the network component is operating in an oversubscribed region of operation. In one embodiment, when the network component is operating in the oversubscribed region of operation, certain quality of service metrics are monitored. Using the monitored metrics, a network operation display object may be generated for identifying or troubleshooting network errors during an oversubscribed region of operation of the network component.

20 Claims, 8 Drawing Sheets

OVERSUBSCRIPTION MONITOR

CROSS-REFERENCE TO RELATED APPLICATIONS

This application claims the benefit of U.S. Provisional Application No. 61/765,924, filed Feb. 18, 2013, the entire contents of which are hereby incorporated herein by reference.

BACKGROUND

Among other functions, a network component, such as a network switch, routes or switches data from a source to a destination. For example, a network switch may receive network packets on one or more input ports and route or switch these packets to one or more output ports. Packets entering the switch may be subject to scheduling according to packet priorities and network communications protocols.

In this context, as packets are received, a switch processes the packets according to the packet priorities and protocols, so that the packets may be ultimately transmitted toward network destinations. In certain cases, the rate at which data enters a network component may exceed the network component's ability to process that data. In some cases, such as during prolonged data bursts, memory buffers may be relied upon to temporarily store data before it is processed. Even with the memory buffers, a network component may drop data packets if the rate at which the data enters the network component exceeds the network component's ability to process that data for a prolonged period of time, for example.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
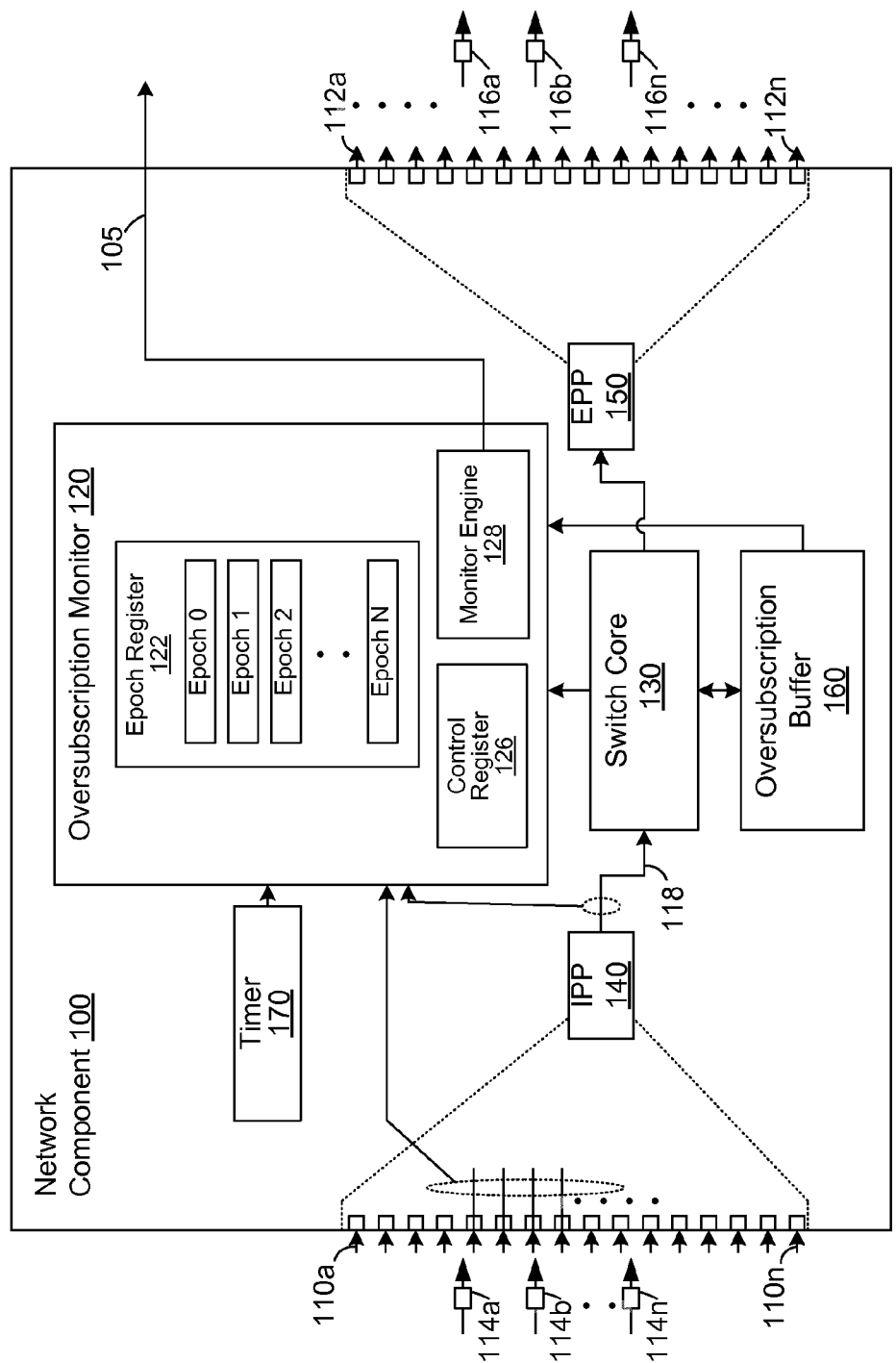
FIG. 1 illustrates an example network component according to certain aspects of embodiments described herein.

Among other functions, a network component, such as a network switch, routes or switches data from a source to a destination. For example, a network switch may receive network packets on one or more input ports and route or switch these packets to one or more output ports. In this context, as packets are received, a switch processes the packets according to the packet priorities and protocols, so that the packets may be ultimately transmitted toward network destinations. In certain cases, the rate at which data enters a network component (i.e., the input/output (I/O) bandwidth) may exceed the network component's ability to process that data (i.e., the core bandwidth). Such a condition where the I/O bandwidth of a network component exceeds its core bandwidth is described as an oversubscribed condition or an oversubscribed mode of operation of the network component.

Even with the memory buffers to assist during an oversubscribed mode of operation, a network component may drop data packets if the rate at which the data enters the network component exceeds the network component's ability to process that data for a prolonged period of time, for example. Especially in large network systems, a network operator may wish to determine how often certain elements of the network operate in an oversubscribed mode. Further, the operator may need to determine how operation in the oversubscribed mode impacts the integrity of the data network or the data communicated on the data network.

In the context described above, aspects of an oversubscription monitor are described herein. Generally, the embodiments described herein may be used to measure the impact of oversubscription events, if any, when they do occur. The embodiments described herein provide network operation display data objects and/or instrumentation to identify intervals of time over which a given ingress pipeline, for example, of a network component operates in an oversubscribed mode. Further, the embodiments also provide various feedback metrics in the form of drop counters, flow control event counters, etc. that can be used to identify and/or estimate any impact on network performance. Network operators, using the feedback provided by the oversubscription monitor, may be able to eliminate ingress oversubscription as a source of a network issue.

Aspects of methods, devices, and systems for oversubscription monitoring are described. In one embodiment, oversubscription monitoring includes accumulating an amount of data that arrives at a network component over at least one epoch of time. Further, a core processing rate at which data can be processed by the network component is calculated. Based on the amount of data and the core processing rate, it is determined whether the network component is operating in an oversubscribed region of operation. In one embodiment, when the network component is operating in the oversubscribed region of operation, certain quality of service metrics are monitored. Using the monitored metrics, a network operation display object may be generated for identifying or troubleshooting network errors during an oversubscribed region of operation of the network component.

Turning now to the drawings, a general description of exemplary embodiments of a network component is provided, followed by a discussion of the operation of the same.

FIG. 1 illustrates an example network component 100 according to certain aspects of the embodiments described herein. The network component 100 may correspond to a switch, a router, a hub, a bridge, or any other similar network device. Generally, the network component is configured, among other things, to route and/or switch data packets among and between network components in a data network. In one aspect, the network component 100 is configured to receive one or more data packets from a network source and route and/or switch these packets to a network destination.

The network component 100 comprises one or more input or ingress ports 110a-110n and one or more output or egress ports 112a-112n. The network component 100 may receive data packets 114a-114n on any of the input ports 110a-110n. Further, the network component 100 may transmit data packets 116a-116n on any of the output ports 112a-112n. The network component 100 further comprises an ingress packet processor 140, an oversubscription monitor 120, a switch core 130, an egress packet processor 150, an oversubscription buffer 160, and a timer. Features and aspects of the elements of the network component 100 are described in further detail below.

Although a number of ports are illustrated in the example network component 100 of FIG. 1, the network component 100 may comprise a fewer or greater number of ports. Further, it should be appreciated that the network component 100 generally comprises other elements such as circuitry for rate control, packet inspection, data processing etc., and other supporting circuitry such as power supplies. Additionally, while one ingress packet processor 140 and one egress packet processor 150 are illustrated, it should be appreciated that the network component 100 may include additional ingress and egress packet processors, along with additional ports.

In certain aspects, the network component 100 assists with data traffic flow by receiving data packets 114a-114n via the input ports 110a-110n, determining a destination for the data packets based on header information, for example, of the data packets, and transmitting data packets 116a-116n via the output ports 112a-112n. In certain cases, while awaiting transfer to a destination network address, the received data packets 114a-114n must be stored in the oversubscription buffer 160. The buffer 160 may be relied upon by the network component 100 to store data packets while they are awaiting further processing or distribution.

The switch core 130 is configured to receive network packets, determine a particular network destination for the packets, and route or switch the packets to various network destinations. In this context, as packets are received, the switch core 130 may process packets according to certain packet priorities and protocols, so that the packets may be ultimately transmitted toward network destinations.

The ingress packet processor (IPP) 140 processes the data packets 114a-114n upon receipt by the network component 100. For example the IPP 140 may strip payload data from one or more of the data packets 114a-114n, and provide this payload data to the switch core 130. Additionally, the IPP 140 may examine protocol headers associated with the data packets 114a-114n, to gather routing or other information of the data packets 114a-114n, and provide this information to the switch core 130. The IPP 140 may be configured, for example, to examine Transmission Control Protocol/Internet Protocol (TCP/IP) or similar packet headers and provide certain routing information to the switch core 130. The egress packet processor (EPP) 150 prepares data for outbound transmission via one or more of the output ports 112a-112n. For example, the EPP 150 may append header or other protocol information to payload data, at the direction of the switch core 130, so that data may be routed to other downstream network components.

If the I/O bandwidth at the input ports 110a-110n of the network component 100 exceeds the core processing bandwidth of the switch core 130, then the network component 100 operates in an oversubscribed mode. In this case, some data from the received data packets 114a-114n may be stored in the buffer 160. This data may be read from the buffer 160 by the switch core 130 at a rate defined, in part, by the core bandwidth of the switch core 130. After processing by the switch core 130, the EPP 150 prepares data for outbound transmission via one or more of the output ports 112a-112n.

As the ingress packet rate exceeds the processing rate of the network component 100, the occupancy of the buffer 160 increases over time. Because the buffer 160 is of a limited size, packets received by the network component 100 may be lost if the buffer 160 is full. That is, packets may be lost due to packet drop, among other, events. Especially when the buffer 160 is at a nearly-full condition, the risk of packet loss by packet drop increases. As further described below, in certain aspects, the oversubscription monitor 120 may monitor and/or register packet drops.

If buffer occupancy (or utilization) becomes too high, then the network component 100 may command a source of the incoming packets to reduce a rate of packet transmission. That is, the network component 100 may issue a flow control command to request a reduced rate of packets being received from a source. As discussed in further detail below, the issuance of a flow control command by the network component comprises a flow control event that may be monitored or counted, as a type of oversubscription feedback metric. As further described below, in certain aspects, the oversubscription monitor 120 may monitor, measure, and/or register flow control events.

The oversubscription monitor 120 comprises an epoch register 122, a control register 126, and a monitor engine 128. The epoch register 122 stores quality of service metrics measured by the monitor engine 128. The epoch register 122 comprises various drop count, flow control, and buffer usage registers, for example, as further described below with reference to FIG. 3. It should be appreciated that the epoch register 122 may comprise any form of memory element suitable for storing data gathered by the oversubscription monitor 120.

Among other functions, the oversubscription monitor 120 may be configured to accumulate an amount of data that arrives at the network component 100, per input port 110a-110n, over at least one epoch of time. As described herein, an epoch of time comprises a period of time of any length. In one embodiment, the monitor engine 128 accumulates the amount of data that arrives at the pipeline 118 of the IPP 140 over respective epochs, as an I/O bandwidth per epoch metric. Thus, in various embodiments, the oversubscription monitor 120 may aggregate an amount of data that arrives over one or more (or all) of the input ports 110a-110n, and measure the aggregated amount of data. In this context, it is noted that the pipeline 118 may represent a position in the network component 100 where a bottleneck may occur due to an aggregation of data from one or more of the input ports 110a-110n. The oversubscription monitor 120 may measure the aggregated amount of data that arrives at the pipeline 118, which represents a point in which a bottleneck may occur.

It is noted that, because the I/O bandwidth rate of any of the ports 100a-100n, individually, may not be sufficient to force the network component 100 to operate in an oversubscribed mode, the monitor engine 128 accumulates received data at the pipeline 118. In certain cases, based on hardware and other requirements, for example, the monitor engine 128 may accumulate an amount of data that arrives at each of the ports 100a-100n. This data is aggregated by the monitor engine 128 to determine the amount of data that arrives at the pipeline 118.

The monitor engine 128 may be further configured to calculate a core processing rate at which data can be processed by the switch core 130 of the network component 100. In various embodiments, the core processing rate of the switch core 130 may be calculated based on certain factors including a cell size of received packets and a clock frequency of the switch core 130. As the I/O bandwidth rate is generally determined per epoch, in certain embodiments, the core processing rate of the switch core 130 is also calculated per epoch.

Based on the amount of data and the core processing rate, the oversubscription monitor 120 may determine whether the network component 100 is operating in an oversubscribed region of operation. In one embodiment, when the network component is operating in the oversubscribed region of operation, the monitor engine 128 is configured to monitor and measure certain quality of service metrics, such as dropped packets and flow control events, for example. Using the measured metrics, the monitor engine 128 is configured to generate a network operation display object for identifying or troubleshooting network errors during an oversubscribed region of operation of the network component 100.

In some embodiments, the oversubscription monitor 120 may mark certain packets that flow through the network component 100 or an oversubscribed port of the network component 100 with a congestion notification marking. For example, if the network component 100 or port of the network component 100 is oversubscribed, the oversubscription monitor 120 may mark packets to indicate congestion in the network component 100. In one embodiment, marking a packet to indicate congestion may include marking the packet with an explicit congestion notification (ECN).

In certain aspects, monitoring and measuring quality of service metrics by the monitor engine 128 is coordinated in time across the ports 100a-100n with reference to the timer 170. In one embodiment, the timer 170 comprises a timer of the network component 100 synchronized based on a network timing or synchronization protocol. For example, the timer 170 may be synchronized in the network component 100 according to IEEE 1588 protocol standard syntax and commands.

In various embodiments, the monitor engine 128 relies upon control flags and/or other data stored in the control register 126, to determine certain operating parameters for oversubscription monitoring. The monitor engine 128 also relies upon the epoch register 122 to store data gathered over a plurality of epochs of time, as described below with reference to FIG. 3, so that network events over a window of time may be analyzed. In this context, a window of time comprises several epochs of time. As non-limiting examples, a window of time may include 10-20 epochs of time, although the window may include any other suitable number of epochs. As illustrated, the epoch register 122 comprises separate memory areas or registers for epochs 0 to N. It is noted that, in various embodiments, the epoch register 122 may include memory areas for any number of individual epochs of time, limited only by the amount of available memory space. Further features of the monitor engine 128 are described below.

As described below with reference to FIGS. 4 and 5, the monitor engine 128 is further configured to generate various network operation display objects based on the oversubscription metric data values stored in the epoch register 122. The objects may illustrate an amount of data received by the network component 100, per epoch, in units of bytes and/or packets. Additionally, the objects may illustrate a rate at which bytes and/or packets arrived at the network component 100 and a representation of a peak processing rate of the switching core 130. These metrics may be provided per epoch in one or more display objects with a representation of any packet loss and/or flow control events, to provide an indication as to whether the network component 100 was operating in an oversubscribed mode and whether network errors occurred during the oversubscribed mode of operation.

Figure 2:
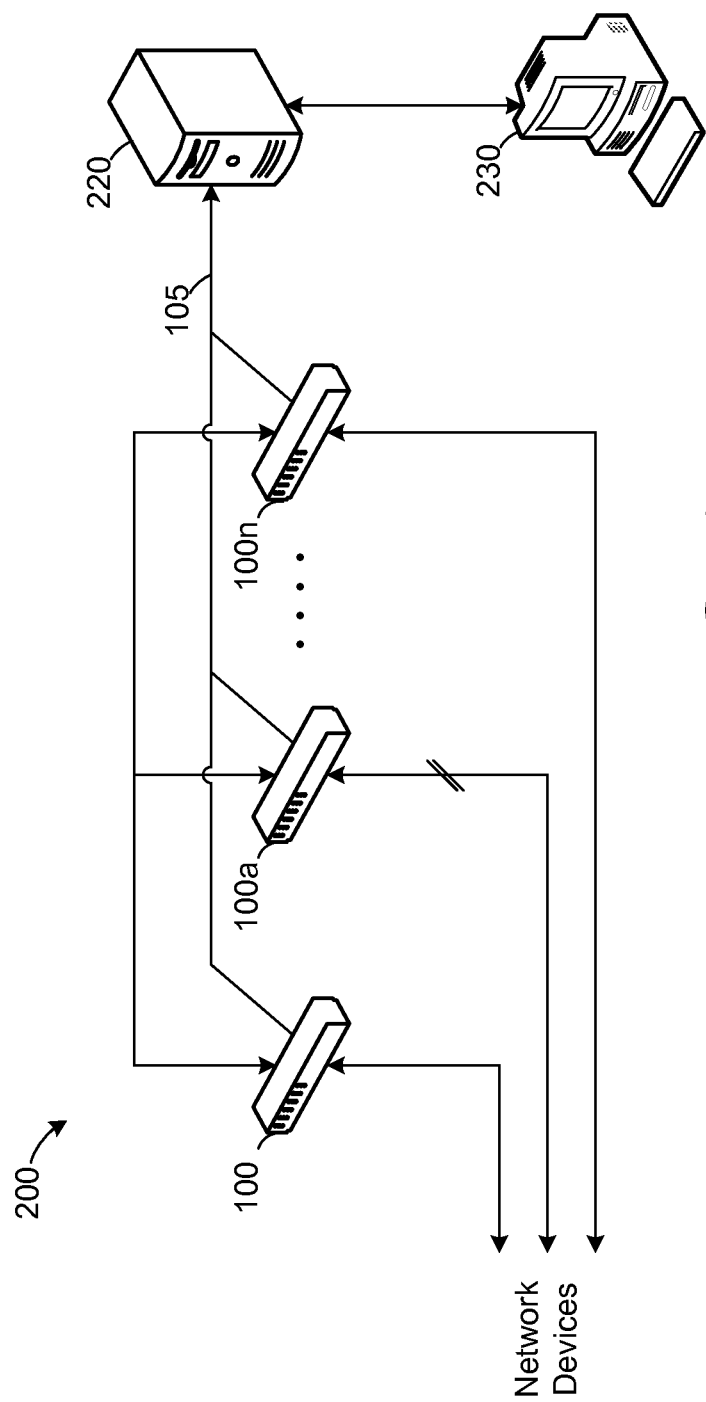
FIG. 2 illustrates an example system diagram including the network component of FIG. 1, according to an example embodiment.

Before turning to FIG. 2, it is noted that the monitor engine 128 may also be configured to generate a consolidated data batch by consolidating, over each of a plurality of epochs of time, one or more of an amount of data that arrives, a number of data drop events, a number of flow control events, or a maximum usage of the oversubscription buffer 160 at the network component 100. This consolidated data batch may be transmitted via the channel 105 to a data aggregator, such as a server computer, that collects oversubscription data from a plurality of network components and generates a network object of network operational conditions.

FIG. 2 illustrates an example system diagram of a system 200 including the network component 100 of FIG. 1, according to an example embodiment. The system 200 comprises the network component 100, various other network components 100a-100n similar to the network component 100, a data aggregator 220, and a client device 230. Generally, the network component 100 and network components 100a-100n communicatively couple network devices for the communication of data over a network. The network component 100 includes the oversubscription monitor 120, as described herein, and the components 100a-n also each includes oversubscription monitors similar to the oversubscription monitor 120. The data aggregator 220, which may comprise a server computer, collects oversubscription data batches from the network components 100 and 100a-100n.

In various embodiments, the data aggregator 220 consolidates, aggregates, and analyzes the data batches, to generate oversubscription data representative of the system 200. Using the aggregated oversubscription data batches, the data aggregator 220 is configured to generate various network objects illustrative of network operational conditions. For example, the client device 230 may request statistics on certain oversubscription states of the system 200 from the data aggregator 220 and, in response, the data aggregator 220 is configured to produce the statistics and/or generate network objects representative of the statistics. Using the statistics, a network operator may be able to identify or troubleshoot network errors in the system 200.

Figure 3:
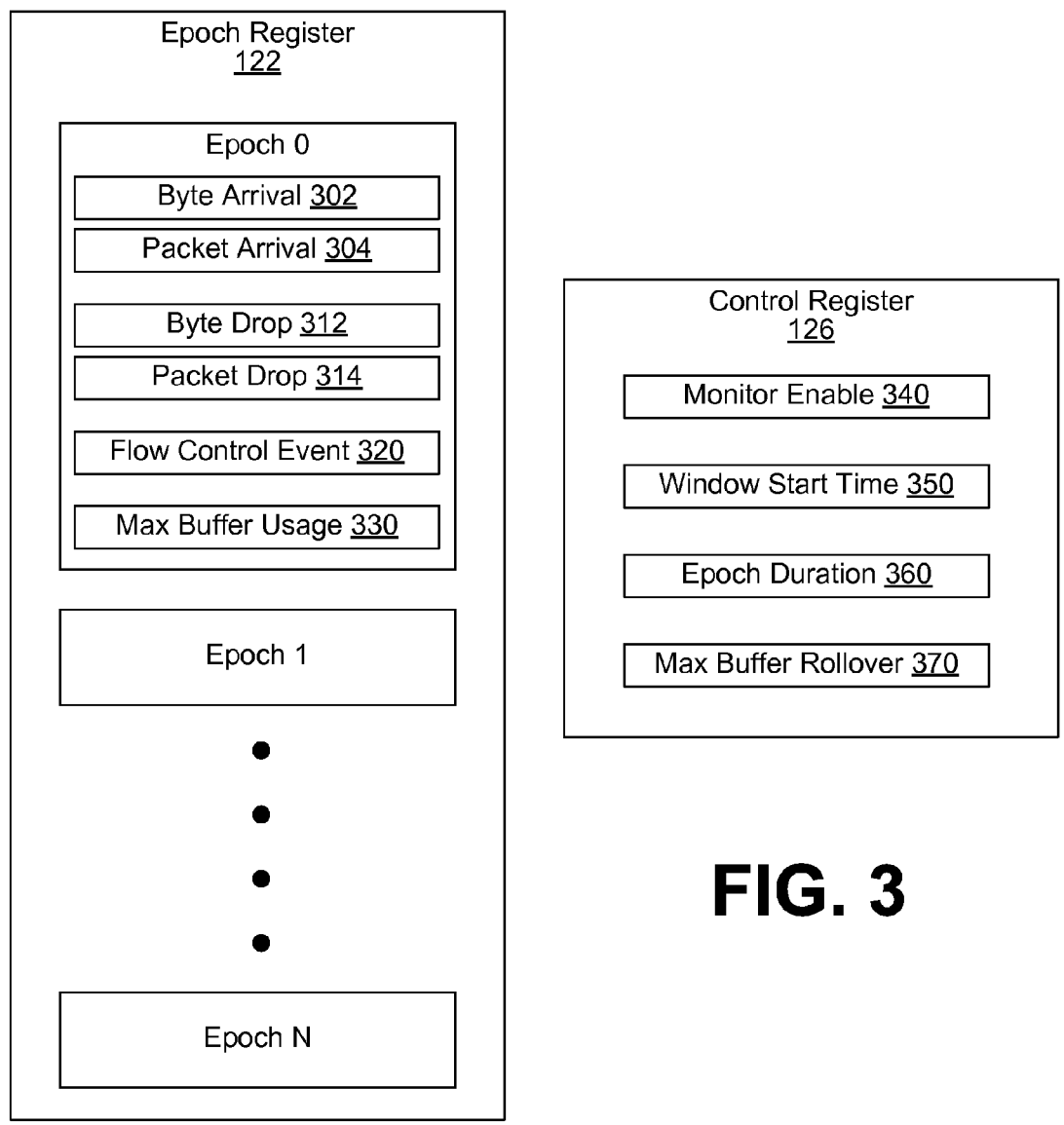
FIG. 3 illustrates example organizations of certain memory registers relied upon by the network component of FIG. 1 to store network service metrics and control data.

FIG. 3 illustrates example organizations of the epoch register 122 and the control register 126 of the network component 100 of FIG. 1. As described above, the epoch register 122 is organized into memory areas for epochs 0 to N. It is noted again that, in various embodiments, the epoch register 122 may include memory areas for any number of individual epochs and/or windows of time. In the embodiment of the epoch register 122 illustrated in FIG. 3, the memory area for epoch 0 includes a byte arrival register 302, a packet arrival register 304, a byte drop register 312, a packet drop register 314, a flow control event register 320, and a maximum buffer usage register 330. It should be appreciated that each of the memory areas for the remaining epochs 1 to N in the epoch register 122 is organized in a manner that is similar to the memory area for epoch 0. The registers or memory areas 302, 304, 312, 314, 320, and 330 illustrated in FIG. 3 are provided by way of example only, and other registers for storing additional and/or alternative data metrics are within the scope and spirit of the embodiments described herein.

In various embodiments of the network component 100 of FIG. 1, the monitor engine 128 relies upon the byte arrival register 302 to store a number of bytes that arrive on each of the ports 110a-110n of the network component 100, during the time period of epoch 0. Similarly, the monitor engine 128 relies upon the packet arrival register 304 to store a number of packets that arrive on each of the ports 110a-110n, during the time period of epoch 0. From the information stored in the byte and packet registers 302 and 304 for each of the ports 110a-110n, the monitor engine 128 can determine an amount of bytes and/or packets that arrive on the pipeline 118, because the aggregate data traffic on the pipeline 118 is dependent upon the data traffic on the respective ports 110a-110n.

Because, in some cases, the core bandwidth of the switch core 130 may always be great enough to process the data received at any individual one of the ports 110a-110n, the oversubscription monitor 120 is configured in certain embodiments to accumulate an amount of data that arrives at each of the ports 110a-110n, to determine an amount of data that arrives for the pipeline 118. In certain conditions, the core bandwidth of the switch core 130 may not always be great enough to process the amount of data received over the pipeline 118. In other embodiments, the oversubscription monitor 120 may be configured to directly monitor or measure an amount of data that arrives at the pipeline 118.

Referring again to FIG. 3, the monitor engine 128 relies upon the byte drop register 312 to store a number of bytes that are dropped for each of the ports 110a-110n, during the time period of epoch 0. Similarly, the monitor engine 128 relies upon the packet drop register 314 to store a number of packets that are dropped for each of the ports 110a-110n, during the time period of epoch 0. From the information stored in the byte and packet drop registers 312 and 314 for each of the ports 110a-110n, the monitor engine 128 can determine a total number of bytes and/or packets that are dropped and a total number of flow control events.

In addition to storing data drop events, the monitor engine 128 relies upon the flow control event register 320 to store a number of flow control events that occur for each of the ports 110a-110n, during the time period of epoch 0. The monitor engine 128 also relies upon the maximum buffer usage register 330 to store the maximum usage of the oversubscription buffer 160. As further described below, the maximum usage may be captured and stored per epoch or per window based on a control flag or register.

Referring back to FIG. 3, the control register 126 includes a monitor enable register 340, a window start time register 350, an epoch duration register 360, and a maximum buffer rollover register 370. The values of the registers 340, 350, 360, and 370 may be user-defined in certain embodiments, with default settings being provided by the oversubscription monitor 120. Generally, the monitor enable register 340 may be relied upon by the network component 100 to determine whether the oversubscription monitor 120 is enabled to perform oversubscription monitoring.

The window start time register 350 stores a start time for a new window of oversubscription monitoring. That is, the oversubscription monitor 120 relies upon the window start time register 350 to identify or reference a time period to start oversubscription data metric monitoring. In certain embodiments, for example, the time stored in the window start time register 350 may be relative to the time maintained by the timer 170 of the network component 100. It is again noted that the time maintained by the timer 170 is available as a reference to each of the ports 110a-110n of the network component 100, in various embodiments, so that monitoring may be coordinated for each of the ports 110a-110n.

The epoch duration register 360 may be relied upon by the oversubscription monitor 120 to determine a time duration for each epoch within a window time period. In one example embodiment, the epoch duration register 360 may specify an epoch time period of 100 us, 1 ms, 10 ms, 100 ms, or 1 second, for example. The maximum buffer rollover register 370 specifies the manner in which the maximum buffer usage of the oversubscription buffer 160 is stored by the maximum buffer usage register 330. For example, the maximum buffer usage of the oversubscription buffer 160 may be captured and stored in the maximum buffer usage register 330 per epoch or per window, depending upon a value specified by the maximum buffer rollover register 370. If not stored per epoch, the maximum buffer usage of the oversubscription buffer 160 may be monitored over an entire window of time, and stored in the maximum buffer usage register 330 as a rolling measurement of the maximum buffer usage over the entire window.

In various embodiments, as described above, the oversubscription monitor 120 performs monitoring and sampling using a window composed of 10 to 20 epochs, and the duration of each epoch may be configurable. In one embodiment, the first epoch entry in the epoch register 122 contains a snapshot of oversubscription metric values at the beginning of a new window of time. Each remaining epoch entry in the epoch register 122 contains a snapshot of the oversubscription metric values for an epoch at the end of the epoch, through each epoch in the window.

Figure 4:
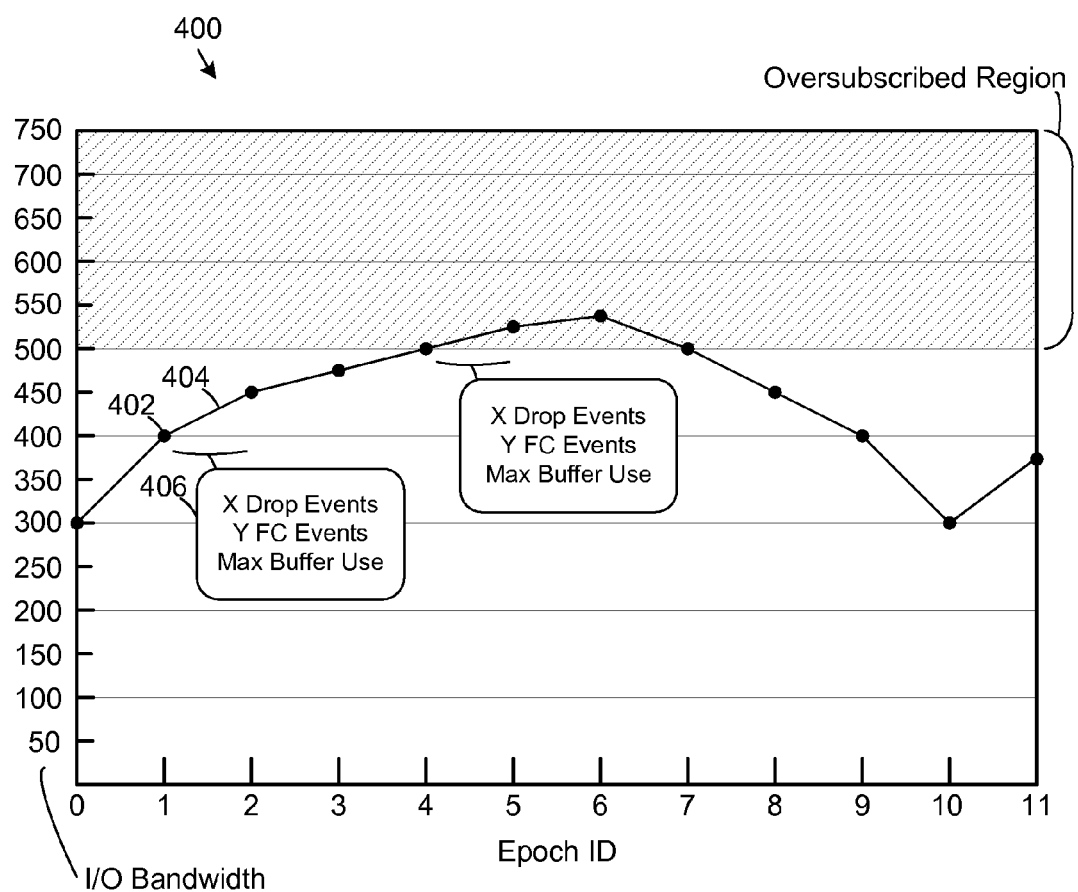
FIG. 4 illustrates an example network operation display object generated by the network component of FIG. 1 according to one embodiment.

FIG. 4 illustrates an example network operation display object 400 generated by the network component 100 of FIG. 1 according to one embodiment. The monitor engine 128 the network component 100 of FIG. 1 is configured to retrieve the data stored in the epoch register 122 and perform the processing necessary to generate the display object 400. In the display object 400, a graph of I/O bandwidth over epoch time periods is provided for a window of 11 epochs. On the left axis of the object 400, I/O bandwidth units are provided. On the bottom axis of the object 400, epoch identifiers are provided. In the display object 400, data points 402 are indicated per epoch, to illustrate an amount of data that arrived at the network component 100 for each epoch. A line 404 connects the data points 402. The data points 402 may be representative of bytes or packets, in various embodiments. In some embodiments, separate data points may be provided for both bytes and packets on the same object, or separate display objects may be provided for bytes and packets respectively.

The display object 400 also identifies an oversubscribed region of operation of the network component 100, as illustrated, along with a dialog box 406 for one or more epochs that illustrate various oversubscription metric data. The oversubscribed region of operation may be determined by the monitor engine 128 based on a measure of the I/O bandwidth vs. the core processing bandwidth for the network component 100. Referring to the display object 400, it can be easily determined that the network component 100 operated in an oversubscribed mode of operation during, at least during epochs 5 and 6.

The dialog box 406 of the display object 400 displays, in various embodiments, a number of drop events, a number of flow control events, and a maximum buffer usage value. The number of drop and flow control events in the dialog box 406 may be presented for each port of the network component 100. Alternatively, the number of drop and flow control events may be presented as a measure for all ports of the network component 100. Similarly, the maximum buffer usage value may be presented per epoch or as a rolling maximum buffer usage value over the entire window of epochs, as described above.

It should be appreciated that the display object 400 is provided by way of example only, as other objects and object variants for display are within the scope and spirit of the embodiments described herein. For example, the display object 400 may take the form of a line chart, bar chart, or other suitable display. Also, any of the oversubscription data metrics, such as those in the dialog box 406, may be presented in the form of a line chart, bar chart, or other suitable display. Further, the display object 400 may cover additional or fewer epochs of time.

Figure 5:
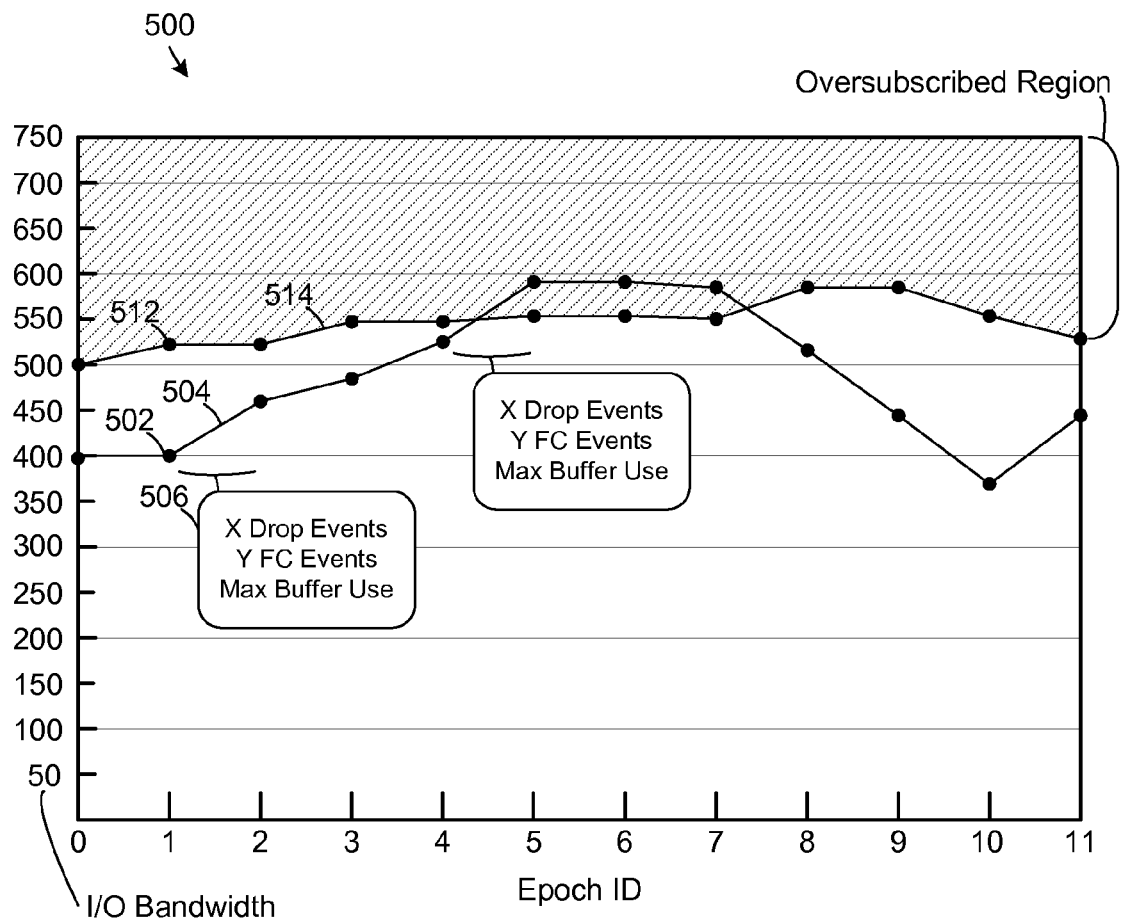
FIG. 5 illustrates another example network operation display object generated by the network component of FIG. 1 according another embodiment.

FIG. 5 illustrates an example network operation display object 500 generated by the network component 100 of FIG. 1 according another embodiment. Again, the monitor engine 128 the network component 100 of FIG. 1 is configured to retrieve the data stored in the epoch register 122 and perform the processing necessary to generate the display object 500. In the display object 500, a graph of I/O bandwidth over epoch time periods is provided for a window of 11 epochs. On the left axis of the object 500, I/O bandwidth units are provided. On the bottom axis of the object 500, epoch identifiers are provided. In the display object 500, data points 502 are indicated per epoch, to illustrate an amount of data that arrived at the network component 100 for each epoch. A line 504 connects the data points 502. The data points 502 may be representative of bytes or packets, in various embodiments. In some embodiments, separate data points may be provided for both bytes and packets on the same object, or separate display objects may be provided for bytes and packets respectively.

It should be appreciated that the display object 500 is provided by way of example only, as other objects and object variants for display are within the scope and spirit of the embodiments described herein. For example, the display object 500 may take the form of a line chart, bar chart, or other suitable display. Also, any of the oversubscription data metrics, such as those in the dialog box 506, may be presented in the form of a line chart, bar chart, or other suitable display. Further, the display object 500 may cover additional or fewer epochs of time.

The display object 500 also identifies changes in an oversubscribed region of operation of the network component 100, over time, as illustrated. In the display object 500, data points 512 are indicated to illustrate changes in the region of oversubscribed operation. A line 514 connects the data points 512. As with the display object 400 of FIG. 4, the oversubscribed region of operation in the display object 500 may be determined by the monitor engine 128 based on a measure of the I/O bandwidth vs. the core processing bandwidth for the network component 100. Thus, a primary variable in the positions of the data points 502 includes the core processing bandwidth of, for example, the switch core 130 of the network component 100. It is noted that, in various embodiments, a clock or operating frequency of the switch core 130 may be variable over time to save power, for example. Thus, the display object 500 may identify changes in the oversubscribed region of operation of the network component 100 over time in view of any changes in processing capabilities of the switch core 130. Referring to the display object 500, it can be easily determined that the network component 100 operated in an oversubscribed mode of operation during, at least during epochs 5-7.

The display object 500 also includes a dialog box 506 for one or more epochs that illustrate various oversubscription metric data. The dialog box 506 of the display object 500 displays, in various embodiments, a number of drop events, a number of flow control events, and a maximum buffer usage value, and is similar to the dialog box 406 of the display object 400 of FIG. 4. It should be appreciated that the display object 500 is provided by way of example only, as other objects and object variants for display are within the scope and spirit of the embodiments described herein.

Figure 6:
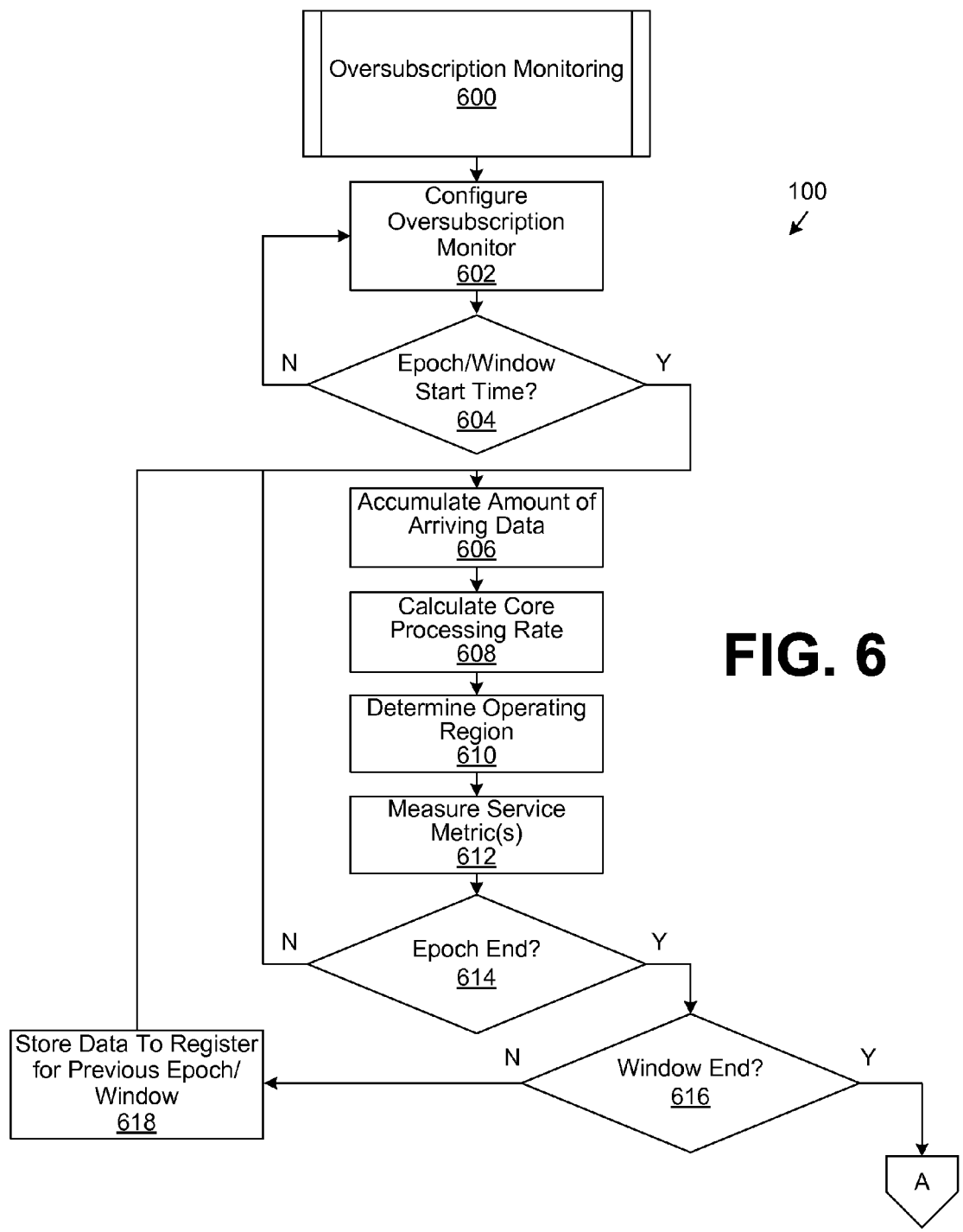
FIG. 6 illustrates an example process flow diagram of a process of oversubscription monitoring performed by the network component of FIG. 1 according to an example embodiment.
Figure 7:
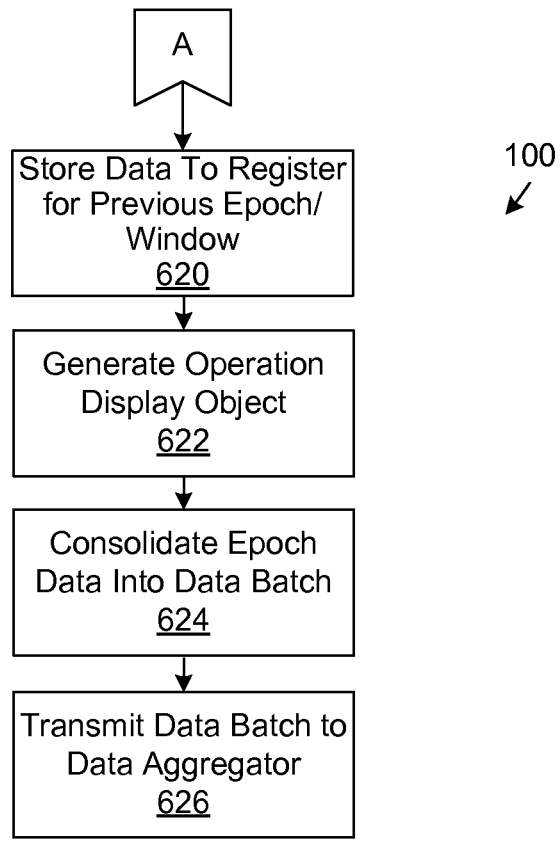
FIG. 7 further illustrates the example process flow diagram of the process of FIG. 6 according to an example embodiment.

Referring next to FIGS. 6 and 7, process flow diagrams illustrating example processes performed by the network component 100 of FIG. 1 are provided. It is understood that the flowcharts of FIGS. 6 and 7 provide merely one example functional arrangement that may be employed to implement the operations of the network component 100, as described herein. In certain aspects, the flowcharts of FIGS. 6 and 7 may be viewed as depicting an example of steps performed by the network component 100 according to one or more embodiments. In alternative embodiments, network components similar to the network component 100 may perform the processes illustrated in FIGS. 6 and 7.

Turning to FIG. 6, an example process flow diagram of a process 600 of oversubscription monitoring performed by the network component 100 of FIG. 1 according to an example embodiment is illustrated. At reference numeral 602, the oversubscription monitor 120 of the network component 100 is configured for oversubscription monitoring based on the values stored in the control register 126. For example, the oversubscription monitor 120 may be configured based on values stored in the monitor enable register 340, the window start time register 350, the epoch duration register 360, and the maximum buffer rollover register 370. As discussed above, the oversubscription monitor 120 may be enabled or disabled according to a value stored in the monitor enable register 340, and the oversubscription monitor 120 may start oversubscription monitoring according to a time defined in the window start time register 350.

At reference numeral 604, the monitor engine 128 of the oversubscription monitor 120 determines whether to start oversubscription monitoring according to the time specified in the window start time register 350. In one embodiment, a start time for oversubscription monitoring is determined at reference numeral 604 according to a comparison between the window start time register 350 and the timer 170 of the network component 100. In this context, if the evaluation at reference numeral 604 indicates that a new monitoring window or epoch of a monitoring window has started, the process proceeds to reference numeral 606. Alternatively, the process proceeds back to reference numeral 602.

At reference numeral 606, the monitor engine 128 monitors and/or accumulates an amount of data that arrives at the ingress ports 110a-110n. As described above, the amount of data that arrives may be accumulated in terms of bytes or packets, in various embodiments. Additionally, a core processing rate of the switch core 130 or other elements of the network component 100 may be monitored. This rate metric may be in cells, bytes, or packets per second, for example. At reference numeral 608, the monitor engine 128 calculates a core processing rate of the network component 100. In various embodiments, at reference numeral 608, the core processing rate of the switch core 130 of the network component 100 may be calculated based on certain factors including a cell size of received packets and a clock frequency of the switch core 130.

At reference numeral 610, the monitor engine 128 determines an operating region of the network component 100. For example, at reference numeral 610, an oversubscribed or undersubscribed region of operation for the network component 100 may be determined by the monitor engine 128 based on a measure of the I/O bandwidth vs. the core processing bandwidth for the network component 100.

At reference numeral 612, the monitor engine 128 monitors and/or measures service metrics of the network component 100. In one embodiment, the service metrics comprise quality of service metrics. In that context, at reference numeral 612, the monitor engine 128 may measure or count at least one quality of service metric including a number of data drop events and/or a number of flow control events of the network component 100, per port, per byte, and/or per packet, for example. Additionally, measuring service metrics at reference numeral 612 may include determining a maximum fill level of the oversubscription buffer 160 of the network component 100. In some embodiments, it is noted that measuring service metrics at reference numeral 612 is dependent upon whether the network component 100 is determined to be operating in an oversubscribed region. That is, in some embodiments, quality of service metrics are not measured unless the network component is operating in an oversubscribed region of operation, to save processing time and energy, for example.

At reference numeral 612, the monitor engine 128 may also mark certain packets with a congestion notification marking. For example, if one or more quality of service metrics indicate a congested condition, the monitor engine 128 may mark one or more packets with a congestion notification marking. In one embodiment, as discussed above, marking a packet to indicate congestion may include marking the packet with an explicit congestion notification (ECN). The monitor engine 128 may mark a packet with a congestion notification marking, if a number of data drop events and/or a number of flow control events has occurred on one or more ports of the network component 100. For example, one or more packets may be marked with a congestion notification marking, if a number of data drop events and/or flow control events of the network component 100 has reached a certain threshold within a period of time.

At reference numeral 614, the monitor engine 128 determines whether an end of an epoch of time for monitoring has occurred. If not, the process proceeds back to reference numerals 606, 608, 610, and 612, to continue accumulating arriving data, calculating the core processing rate, determining the operating region, and measuring service metrics of the network component 100. Alternatively, if the monitor engine 128 determines at reference numeral 614 that an end of an epoch of time for monitoring has occurred, the process proceeds to reference numeral 616, where the monitor engine 128 determines whether an end of a window of epochs of time has occurred. As described above, a window of epochs may comprise 10 to 20 epochs, for example.

If it is determined that a window of time has not finished at reference numeral 616 (i.e., there are more epochs in the window), then the process proceeds to reference numeral 618, where the monitor engine 128 stores any data monitored and/or accumulated during the previous epoch in the epoch register 122. The data stored may be any of the data monitored and/or accumulated during reference numerals 606, 608, 610, and 612. This data may be stored in the epoch register 122, as described above, for later reference and/or processing. After reference numeral 618, the process proceeds back to reference numeral 606 for a next epoch of processing. On the other hand, if it is determined that a window of time has finished at reference numeral 616, then the process proceeds to reference numeral 620 of FIG. 7. At reference numeral 620 of FIG. 7, the monitor engine 128 stores any data monitored and/or accumulated during the previous epoch in the epoch register 122. The data stored at reference numeral 620 comprises the last epoch of data stored for the current window of time.

Proceeding to reference numeral 622, the monitor engine 128 generates a network operation display object that identifies whether the network component 100 operated in the oversubscribed region over at least one epoch of time. In various embodiments, the network operation display object may also illustrate certain service metrics of the network component 100. The network operation display object may comprise, for example, objects similar to the objects 400 or 500 of FIGS. 4 and 5. Using the display object generated at reference numeral 622, network errors that occur during an oversubscribed region of operation of the network component 100 may be more readily understood or addressed.

Certain embodiments further comprise consolidation of epoch data, as described above with reference to FIG. 2. In these embodiments, at reference numeral 624, the monitor engine 128 consolidates the epoch data stored in the epoch register 122 into a data batch. For example, at reference numeral 624, the monitor engine 128 may generate a consolidated data batch by consolidating, over each of a plurality of epochs of time stored in the epoch register 122 for a window, the amount of data that arrived, the number of data drop events, the number of flow control events, and the maximum usage of the oversubscription buffer at the network component 100.

Further, as described above in connection with FIG. 2, at reference numeral 626, the oversubscription monitor 120 transmits the consolidated data batch to the data aggregator 220. As described above, the data aggregator 220 may collect oversubscription data from a plurality of network components and generate a network object of network operational conditions.

Figure 8:
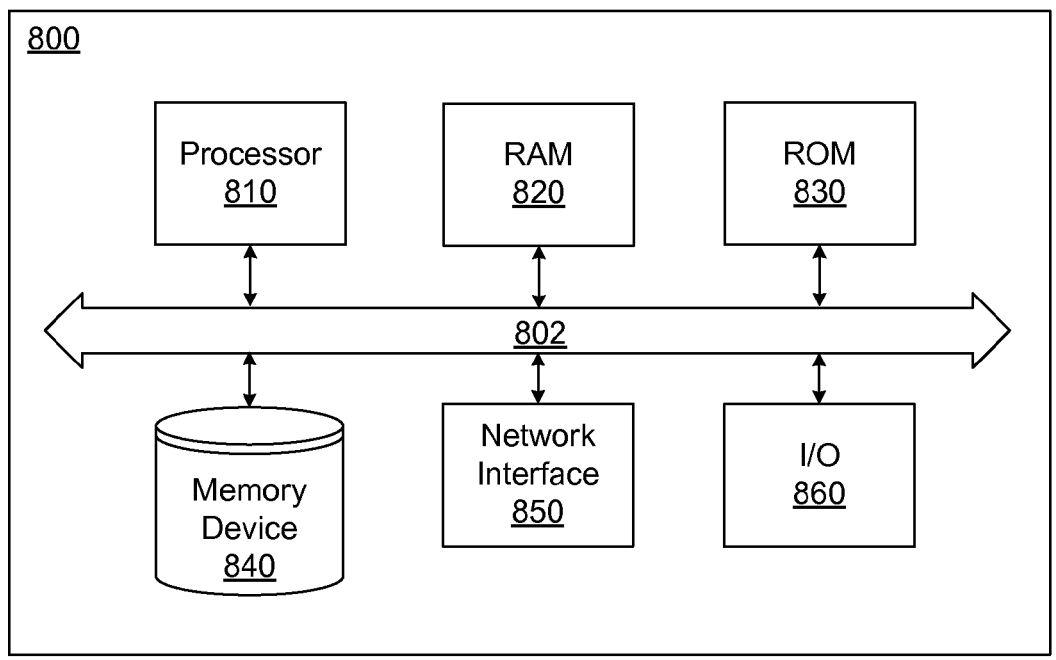
FIG. 8 illustrates an example schematic block diagram of a computing architecture that may be employed by the network component of FIG. 1 according to various embodiments described herein.

FIG. 8 illustrates an example schematic block diagram of a computing device 800 that may be employed by the network component 100 of FIG. 1 according to various embodiments described herein. The computing device 800 may be embodied, in part, using one or more elements of a general purpose computer. The computing device 800 includes a processor 810, a Random Access Memory ("RAM") 820, a Read Only Memory ("ROM") 830, a memory device 840, a network interface 850, and an Input Output ("I/O") interface 860. The elements of computing device 800 are communicatively coupled via a bus 802. The elements of the computing device 800 are not intended to be limiting in nature, as the device may further include other elements.

In various embodiments, the processor 810 may comprise any well-known general purpose arithmetic processor, state machine, or Application Specific Integrated Circuit ("ASIC"), for example. In one embodiment, incoming packets, such as those packets received by the input ports 110a-110 (FIG. 1), are processed by the processor 810. Further the oversubscription monitor 120 may be implemented, in part, by the processor 810. The processor 810 may include one or more circuits, one or more microprocessors, ASICs, dedicated hardware, or any combination thereof. In certain aspects embodiments, the processor 810 is configured to execute one or more software modules. The processor 810 may further include memory configured to store instructions and/or code to various functions, as further described herein. In certain embodiments, the processor 810 may comprise a state machine or ASIC, and the processes described in FIGS. 6 and 7 may be implemented or executed by the state machine or ASIC according to a specialized or embedded circuitry design, by firmware, or a combination of a circuitry and firmware.

The RAM and ROM 820 and 830 comprise any well-known random access and read only memory devices that store computer-readable instructions to be executed by the processor 810. The memory device 840 stores computer-readable instructions thereon that, when executed by the processor 810, direct the processor 810 to execute various aspects of the embodiments described herein.

As a non-limiting example group, the memory device 840 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 850 comprises hardware interfaces to communicate over data networks. The I/O interface 860 comprises device input and output interfaces such as keyboard, pointing device, display, communication, and/or other interfaces. The bus 802 electrically and communicatively couples the processor 810, the RAM 820, the ROM 830, the memory device 840, the network interface 850, and the I/O interface 860, so that data and instructions may be communicated among them.

In certain aspects, the processor 810 is configured to retrieve computer-readable instructions and data stored on the memory device 840, the RAM 820, the ROM 830, and/or other storage means, and copy the computer-readable instructions to the RAM 820 or the ROM 830 for execution, for example. The processor 810 is further configured to execute the computer-readable instructions to implement various aspects and features of the embodiments described herein. For example, the processor 810 may be adapted or configured to execute the processes described above with reference to FIGS. 6 and 7. In embodiments where the processor 810 comprises a state machine or ASIC, the processor 810 may include internal memory and registers for maintenance of data being processed.

The flowcharts or process diagrams of FIGS. 6 and 7 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 810. The machine code may be converted from the source code, etc. Further, each block may represent, or be connected with, a circuit or a number of interconnected circuits to implement a certain logical function or process step.

Although the flowcharts or process diagrams of FIGS. 6 and 7 illustrate an order, it is understood that the order may differ from that which is depicted. For example, an order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method of oversubscription monitoring, comprising:
   accumulating an amount of data that arrives at a network component over an epoch of time;
   calculating a core processing rate at which the data can be processed by the network component;
   determining whether the network component is operating in an oversubscribed region of operation based on the amount of data and the core processing rate;
   when the network component is operating in the oversubscribed region of operation, measuring at least one quality of service metric of the network component; and
   generating a network operation display object that identifies whether the network component operated in the oversubscribed region over at least one epoch of time.

2. The method of claim 1, wherein measuring at least one quality of service metric comprises counting a number of data drop events and a number of flow control events of the network component.

3. The method of claim 2, wherein counting a number of data drop events comprises counting a number of byte or packet data drop events per port of the network component.

4. The method of claim 3, further comprising determining a maximum usage of an oversubscription buffer of the network component over the epoch of time.

5. The method of claim 4, wherein generating a network operation display object further comprises generating an object that identifies, for each of a plurality of epochs of time over a time window, the amount of data that arrives at the network component, the number of data drop events, the number of flow control events, and the maximum usage of the oversubscription buffer of the network component.

6. The method of claim 4, further comprising generating a consolidated data batch by consolidating, over each of a plurality of epochs of time, the amount of data that arrives at the network component, the number of data drop events, the number of flow control events, and the maximum usage of the oversubscription buffer of the network component.

7. The method of claim 6, further comprising transmitting the consolidated data batch to a data aggregator that collects oversubscription data from a plurality of network components.

8. The method of claim 1, wherein the accumulating comprises accumulating, for each of a plurality of epochs of a sampling window, the amount of data that arrives at the network component over the epoch of time.

9. The method of claim 1, wherein:
   accumulating an amount of data comprises accumulating, for each port of a pipeline of the network component, an amount of data that arrives at the port over the epoch of time; and
   the method further comprises aggregating the amount of data accumulated for each port in the pipeline over the epoch of time, to determine an amount of data that arrives at the pipeline of the network component over the epoch of time.

10. A system for oversubscription monitoring, comprising:
    an oversubscription buffer of a network component that buffers received data for processing; and
    an oversubscription monitor that:
      accumulates an amount of data that arrives at the network component over an epoch of time;
      determines whether the network component is operating in an oversubscribed region of operation based on a core processing rate of the network component;
      measures at least one quality of service metric of the network component; and generates a network operation display object that includes a representation of the at least one quality of service metric of the network component and identifies whether the network component operated in the oversubscribed region over the epoch of time.

11. The system of claim 10, wherein the oversubscription monitor further counts a number of data drop events and a number of flow control events of the network component.

12. The system of claim 11, wherein the oversubscription monitor further counts a number of byte or packet data drop events per port of the network component.

13. The system of claim 10, wherein the oversubscription monitor further determines a maximum usage of the oversubscription buffer over the epoch of time.

14. The system of claim 10, wherein the oversubscription monitor further accumulates, for each of a plurality of epochs of a sampling window, the amount of data that arrives at the network component over the epoch of time.

15. The system of claim 10, wherein the oversubscription monitor further:
   accumulates, for each port of a pipeline of the network component, an amount of data that arrives at the port over the epoch of time; and
   aggregates the amount of data accumulated for each port in the pipeline over the epoch of time, to determine an amount of data that arrives at the pipeline of the network component over the epoch of time.

16. A method of oversubscription monitoring, comprising:
   accumulating an amount of data that arrives at a network component and calculating a core processing rate at which data can be processed by the network component over an epoch of time;
   when the network component is operating in an oversubscribed region of operation, measuring at least one quality of service metric of the network component; and
   generating a network operation display object that identifies whether the network component operated in the oversubscribed region over at least one epoch of time.

17. The method of claim 16, wherein measuring at least one quality of service metric comprises:
   counting a number of data drop events and a number of flow control events of the network component; and
   marking a packet of data that arrives at the network component to indicate congestion at the network component based on the number of data drop events or the number of flow control events.

18. The method of claim 17, wherein counting the number of data drop events comprises counting a number of byte or packet data drop events per port of the network component.

19. The method of claim 16, further comprising determining a maximum usage of an oversubscription buffer of the network component over the epoch of time.

20. The method of claim 18, wherein generating a network operation display object further comprises generating an object that identifies, for each of a plurality of epochs of time over a time window, the amount of data that arrives at the network component, the number of data drop events, the number of flow control events, and the maximum usage of the oversubscription buffer of the network component.

* * * * *